United States Patent [19]

Gerhardt et al.

[11] Patent Number: 5,121,387
[45] Date of Patent: Jun. 9, 1992

[54] LINK UTILIZATION CONTROL MECHANISM FOR DEMAND ASSIGNMENT SATELLITE COMMUNICATIONS NETWORK

[75] Inventors: Ed Gerhardt, Palm Bay; William R. Highsmith, Indialantic; Michael Kutchan, Boca Raton, all of Fla.

[73] Assignee: Scientific Atlanta, Melbourne, Fla.

[21] Appl. No.: 640,086

[22] Filed: Jan. 11, 1991

Related U.S. Application Data

[63] Continuation of Ser. No. 236,756, Sep. 26, 1988, Pat. No. 5,003,534.

[51] Int. Cl.⁵ .............................................. H04J 3/26
[52] U.S. Cl. .................................. 370/85.2; 370/94.1; 370/95.3
[58] Field of Search ................. 370/79, 80, 89.2, 94.1, 370/95.1, 95.2, 95.3, 110.1, 85.6; 371/33; 340/825.06, 825.07, 825.5

[56] References Cited

U.S. PATENT DOCUMENTS

| | | | |
|---|---|---|---|
| 4,736,371 | 4/1988 | Tejima et al. | 370/95.1 |
| 4,774,707 | 9/1988 | Raychaudhuri | 370/94.1 |
| 4,775,974 | 10/1988 | Kobayashi | 370/94.1 |
| 4,803,681 | 2/1989 | Takahashi | 370/85.2 |
| 5,003,534 | 3/1991 | Gerhardt et al. | 370/94.1 |
| 5,012,469 | 4/1991 | Sardana | 370/85.2 |

OTHER PUBLICATIONS

"Multiple-Access Protocols for Satellite Packet Communication Networks: A Performance Comparison", Shuji Tasaka, Proceedings of the IEEE, vol. 72, No. 11, Nov. 1984, pp. 1573-1582.

Primary Examiner—Douglas W. Olms
Assistant Examiner—Melvin Marcelo
Attorney, Agent, or Firm—Evenson, Wands, Edwards, Lenahan & McKeown

[57] ABSTRACT

A link utilization control mechanism for a demand assignment satellite communication network employs a modified point-to-point communications protocol (X.25) in order to simulate point-to-point communication ports and thereby interface what is effectively a multidrop network with point-to-point landlink communication resources. Through an acknowledgement reservation mechanism the return link channel is subdivided into interleaved data and (preassigned) acknowledgement time slots, in order to substantially obviate overhead and throughput penalties encountered in the use of large data packets to transmit reduced size acknowledgement messages. In addition, the normal contention mode of operation of the return link is augmented with a data time slot reservation mechanism through which, during periods of increased message input density at a remote station, transmission throughput is facilitated, so that congestion at the remote station is reduced.

18 Claims, 3 Drawing Sheets

LINK UTILIZATION CONTROL MECHANISM FOR DEMAND ASSIGNMENT SATELLITE COMMUNICATIONS NETWORK

This is a continuation of application Ser. No. 236,756, filed Sep. 26, 1988, now U.S. Pat. No. 5,003,534, issued Mar. 26, 1991.

FIELD OF THE INVENTION

The present invention relates in general to communication systems and is particularly directed to a link utilization control mechanism for controlling allocation and throughput of the data transmission links of a satellite communications network.

BACKGROUND OF THE INVENTION

Digital data (packet switching) communication networks have conventionally employed dedicated terrestrial circuits, such as landline telephone systems, to connect a host (mainframe) computer, located at a central or master station, with a plurality of geographically dispersed remote terminals, the locations of which are selected in an effort to meet current and projected communication demands of the system user. Because a dedicated landline telephone link in a multidrop network is an effectively rigid physical communication highway and typically employs some form of master-to-remote polling (point-to-point) mechanism for controlling communications between the master station and the remote stations, both the number and the locations of the stations of the network must be carefully chosen. In addition, it is common practice in packet-switched landline transmission networks to use point-to-point communication protocols between the user terminal and a network entry node, which require dedicated channel connections between the communication ports of the packet switches of the respective stations.

A satellite communication network, on the other hand, offers the user significant flexibility in the deployment of the stations, but is normally does not allow the use of a polling mechanism for controlling access to the communication channel, as in the case of a terrestrial system, because of the substantial transmission delay (wait) penalty that would be incurred. Consequently, a satellite communications network may preferably employ a communication channel that is accessed on a contention or demand assignment basis by the stations, in order to afford maximum, efficient utilization. In such a network, communications from the master station to the remote stations (cutlink transmissions) are broadcast over a first, continuously transmitted frequency (channel) that is monitored by each remote station for messages addressed to it. Messages from the remote stations to the master station (return link transmissions) are transmitted over a second, shared channel, in burst mode, contention format.

Because of the manner in which the satellite communications channels are shared among a plurality of stations, they cannot be readily interfaced with terminal equipment (packet assembly/disassembly circuits for coupling the satellite network to existing landline connection ports). Namely, the local packet interface equipment may typically employ a point-to-point communication protocol, such as X.25 communication protocol, the station-to-station control layer of which contains a transmit/receive channel designation field and implies point-to-point utilization, exclusively. In order for such a protocol to be usable in a multistation satellite network, each earth station (master or remotes) would require a separate channel and port dedicated to each terminal being serviced, something that is practically impossible to achieve in a system that may serve thousands of terminal devices and, because of its use of a shared communications channel, effectively appears as a multidrop network, which is inherently incompatible with point-to-point communication protocols.

An additional problem that is encountered in the use of a shared (contention) communications network is the need for a collision/avoidance mechanism on the shared (remote-to-master) link. Namely, although outlink messages from the master station to the remote stations originate at only a single source (the master station), so that the issue of master-to-remote transmission collisions does not exist, remote stations transmit over the return link channel on a contention basis, so that there is the possibility for remote-to-master transmission collisions.

Efforts to reduce the collision problem in networks employing shared communication channels have included a variety of "permission"-based communication protocols, such as polling mechanisms (intolerable in a satellite network, as noted previously) and time division multiple access transmission formats, which operate, in effect, like polling mechanisms. In a commercial environment, where every effort is made to optimize channel occupancy and throughput, the delay penalty of such protocols makes the unacceptable candidates for handling traffic that may originate from literally thousands of system users (terminal devices) that are served by the stations of some networks.

Unfortunately, conventional collision avoidance/recovery schemes (such as that used in a slotted Aloha communication control mechanism) are effectively unworkable for the class of earth stations known as VSATs (very small aperture terminals) due to the fact that the transmitting (remote) stations are unable to monitor their own signals, because of the VSAT's small antenna and low transmit power. Instead, they rely on the transmission of acknowledgements from the master station to confirm message throughput. Similarly, master-to-remote messages are acknowledged by the remote stations.

Because an acknowledgement is essentially overhead, in terms of message size, it's length is small (on the order of ten bytes or less) compared with the length of a normal data packet (on the order of a thousand bytes). As a consequence, its impact on channel efficiency is particularly noticeable when this or other type of reduced content overhead messages is transmitted as a 'partially-filled' data packet during a normal, fixed data time slot, the remaining unused portion of which may occupy a considerable percentage of the available transmission interval.

A further difficulty that is encountered in demand assignment, burst mode transmission schemes is the substantial reduction in network throughput that occurs when incoming (to be transmitted) traffic at remote stations build up to a level that effectively overloads the network, or reaches the onset of a saturation condition, so as to substantially increase transmission delay to the point that nearly every packet must be retransmitted, due to collisions with other bursts. As a result, the likelihood of a message from a remote station successfully reaching the master station is infinitesimally small, thus reducing network throughput to zero.

SUMMARY OF THE INVENTION

Pursuant to a first aspect of the present invention there is provided a communication interface mechanism that enables messages to be transmitted over a shared communications channel by means of a point-to-point communications protocol, such as internationally employed X.25 protocol, so as to facilitate interfacing of the satellite network with to conventional landlink communication resources. In particular, within the satellite communications network, digital information packet-containing messages are conveyed between a first (master) station and a plurality of remote station over respective dedicated channels (a first, master-to-remote outlink broadcast frequency and a second, remote-to-master return link frequency). The master station contains a packet switch having one or more first ports into which outgoing messages, such as data packets supplied by one or more host mainframe computers for transmission to second terminal devices at the remote stations, are coupled, and from which incoming messages on the return link channel from the remote stations are output to the host computer(s). The master station's packet switch also includes one or more second ports through which outgoing messages it has received from the host computers are coupled to the outlink channel for broadcast to each remote station and to which incoming messages received from the return link channel are applied. Within the packet assembly/disassembly device at each station, data packets are assembled for transmission by means of a point-to-point communication protocol, such as the above-mentioned X.25 protocol, which is inherently incompatible with the shared communications channels of what is, in effect, a multi-drop satellite network, rather than a point-to-point network for which the communications protocol is designed.

In accordance with the present invention, this inherent inconsistency between (X.25) point-to-point communication protocol and a multidrop network is obviated by a modification of the packet switch at each station and a modification of the station-to-station layer of the protocol, so as to enable the outlink and return link channels to effectively simulate point-to-point communications therebetween. For messages transmitted from a remote station to the master station, the modification of the protocol comprises incorporating into each message an auxiliary identification code (such as an additional (abbreviated) two byte, subaddress field) which identifies the remote station sourcing the message. At the master station, the packet switch is provided with an auxiliary memory space, containing a plurality of pseudo port entries (queues), into respective ones of which return link messages coupled from an attendant satellite communications modem to a second port of the packet switch, are stored or buffered, and the addresses of which are designated in accordance with the identification codes of the remote stations contained within the received messages. The master station's packet switch outputs each buffered (X.25) point-to-point protocol message, absent its auxiliary identification code, via a first port of the packet switch to its associated packet assembly/disassembly device, so that the data may be forwarded to its destination host computer. Thus, to the packet assembly/disassembly device, which interfaces the user equipment and the packet switch, communications appear to be effected through dedicated ports of its associated packet switch to a point-to-point link to the remote station.

Consistent with the modification of point-to-point protocol for remote-to-master station communications over the contention return link channel, outgoing messages from a host computer, and coupled from the master station packet assembly/disassembly device to a first port of the packet switch for transmission to a remote station, are initially buffered in the pseudo port entry of the auxiliary memory space of the master station's packet switch, whose address corresponds to the identification of the destination remote station and which appears to packet assembly/disassembly device as a dedicated packet switch output port having a point-to-point connection to the remote station. In the course of outputting the buffered message via a second port for application (by its attendant modem) to the master-to-remote channel, the master station's packet switch incorporates into that message the auxiliary two byte address (the pseudo port entry where the buffered message is stored) which identifies the destination remote station. The message is then broadcast by the master station's modem over the outlink channel to each of the remote stations.

The satellite communication modem at each remote station continuously monitors the master-to-remote channel for messages that may be addressed to it, namely, for the presence of its own identification code within each message broadcast by the master station. When a remote station detects its identification code, it captures the message and then outputs it on to its associated packet assembly/disassembly device, absent the station identification code, so that, to that destination terminal device, it appears as though it has received a message from the master station over a dedicated point-to-point link.

In accordance with a second aspect of the present invention, the overhead and throughput penalties encountered in the use of data packets to transmit small acknowledgement messages are obviated by a channel utilization mechanism that subdivides the availability of the return link channel into a first sequence of data fields or time slots, access to which is normally acquired on a contention basis, and between successive ones of which a second sequence of reduced information capacity overhead time slots (acknowledgement frames) are interleaved for use by the remote stations to transmit acknowledgements over the return link to the master station.

In particular, whenever the master station transmits an message to a remote station, it includes, as part of the message, the identification of a prescribed acknowledgement time slot, relative to a reference time occurrence, within which an acknowledgement message is to be returned by the remote station. (Acknowledgement packets contain sequence numbers which identify the outlink message being acknowledged.) Each remote station monitors the master-to-remote outlink channel for a message transmitted to it from the master station and, in response to receipt of a message from the master station, transmits an acknowledgement message back to the master station during a time slot as identified as part of the received message.

Because the length of an acknowledgement message (usually on the order of ten bytes or less) is considerably shorter than the length of a data packet (often up to one thousand bytes), the reserving of such acknowledgement frames does not detrimentally impact channel utilization. Moreover, preassigning or reserving these reduced capacity slots for return-to-master acknowledgements serves to minimize collisions and thereby improve overall network performance.

In the course of the control of assembly and transmission of a data packet to a remote station, the communications control processor assigns to the recipient remote station a reserved acknowledgement time slot code by referencing that acknowledgement time slot to a network timing signal that is continuously modulated onto the outlink carrier. The communications control processor within the master station also stores the most recent acknowledgement time slot reservation code in a reserved acknowledgement table in order to assure uncontended use of the acknowledgement time slots. Then, as acknowledgements are returned from the remote stations the master station controller knows that it does not have to retransmit the original packet. The underlying data communication protocol (e.g. X.25) includes a timer, so that in the event that the acknowledgement is not returned within a prescribed period of time, the packet will be transmitted and a new acknowledgement slot assigned, thereby permitting the master station communications controller to keep track of whether transmitted data packets have been received and which packets have not been received and need to be retransmitted.

In the course of handling input messages from user equipment for transmission over the return link channel, the message buffer within the communications control unit of the remote station queues data packets supplied by its associated packet assembly/disassembly unit or PAD. Similarly, whenever the PAD has successfully received a data packet from the master station, the communications processor extracts the included acknowledgement slot reservation and stores the reservation in a list in internal memory. The data packet is then passed to the PAD. Subsequently, the PAD may generate one or more acknowledgements (or negative responses).

Pursuant to a redundancy elimination mechanism in accordance with the present invention, as acknowledgements arrive at the communications processor, they are placed in a first-in/first-out (FIFO) acknowledgement reservation buffer, if there is an upcoming acknowledgement reservation in the list. If, for some reason, there are no upcoming acknowledgement reservations in the list, the acknowledgement packets are placed in a separate data FIFO buffer and treated as data packets for the purpose of transmission. As an acknowledgement packet is about to be placed in either the data FIFO buffer or the acknowledgement FIFO, its contents are are examined to determine if the new acknowledgement contains more current acknowledgement information than those currently buffered and awaiting transmission. (It should be noted that an acknowledgement of a packet implicitly acknowledges any previous packets.) If so, the acknowledgment contents are replaced with the new information. Thus, acknowledgement traffic is kept to a minimum by eliminating redundant packets.

As each acknowledgement or data slot occurs, the communications processor decides whether or not to transmit into the slot. If both the acknowledgement reservation list and acknowledgement FIFO are not empty, the communications processor withholds all transmissions until the acknowledgement slot occurs. At that time, the acknowledgement packet is transmitted into the reserved acknowledgement slot and normal processing resumes. This procedure insures proper sequencing of data and acknowledgement packets.

It should be noted that the PAD, upon transmitting a data packet to the master station, typically will repetitively generate a 'poll' packet for some period of time until it receives an acknowledgement packet from the master station. These repeated 'poll' packets are a potential source of message traffic congestion, but are still treated as normal message packets by the communications control unit. Consequently, the use of the acknowledgement redundancy mechanism serves to eliminate superfluous transmissions over the return link channel.

Pursuant to still another feature of the invention, during periods of increased message input density at a remote station, resulting in an increased incidence of collisions on the return link channel and the need to retransmit multiple data packets that are awaiting service (queued) at a remote station, transmission throughput is facilitated by an adaptive data slot reservation mechanism that responds to the high traffic density condition and reserves or assigns data time-slots for use by that remote station, so that potential congestion at the station is reduced.

Namely, as pointed out above, in the course of handling input messages for transmission on the return channel to the master station, the remote station transmission buffer queues up data packets supplied by the packet assembly/disassembly unit through which the remote station interfaces with terminal communication links (e.g. a terrestrial local area network telephone system) that supply messages from user terminals to be transmitted to the master station and for whom received messages are to be delivered. Pursuant to this additional aspect of the invention, the contents of the return link transmission buffer are monitored. In response to the occurrence of a prescribed condition of the contents of the buffer, specifically a condition in which the number of messages awaiting transmission has reached a preselected number and the buffer contains a message that has been previously transmitted and is awaiting retransmission, the remote station interrupts normal outputting of queued packets from the transmission buffer and outputs instead only the leading buffer, tagged with a request for the reservation of contention time slots to be used for the transmission of all the remaining data packets currently awaiting service in the queue.

Upon receipt of a message from the master station containing the identification of contention time slots that are to be reserved for use by the requesting remote station, the remote station proceeds to transmit messages stored in its transmission buffer over the return channel to the master station during the reserved time slots. If the requesting remote station does not receive a reservation message from the master station within a prescribed period of time after transmitting the reservation request, it retransmits the request several times and failing that it proceeds to transmit messages stored in the transmission buffer over the return link channel during non-reserved contention time slots.

DETAILED DESCRIPTION

Figure 1:
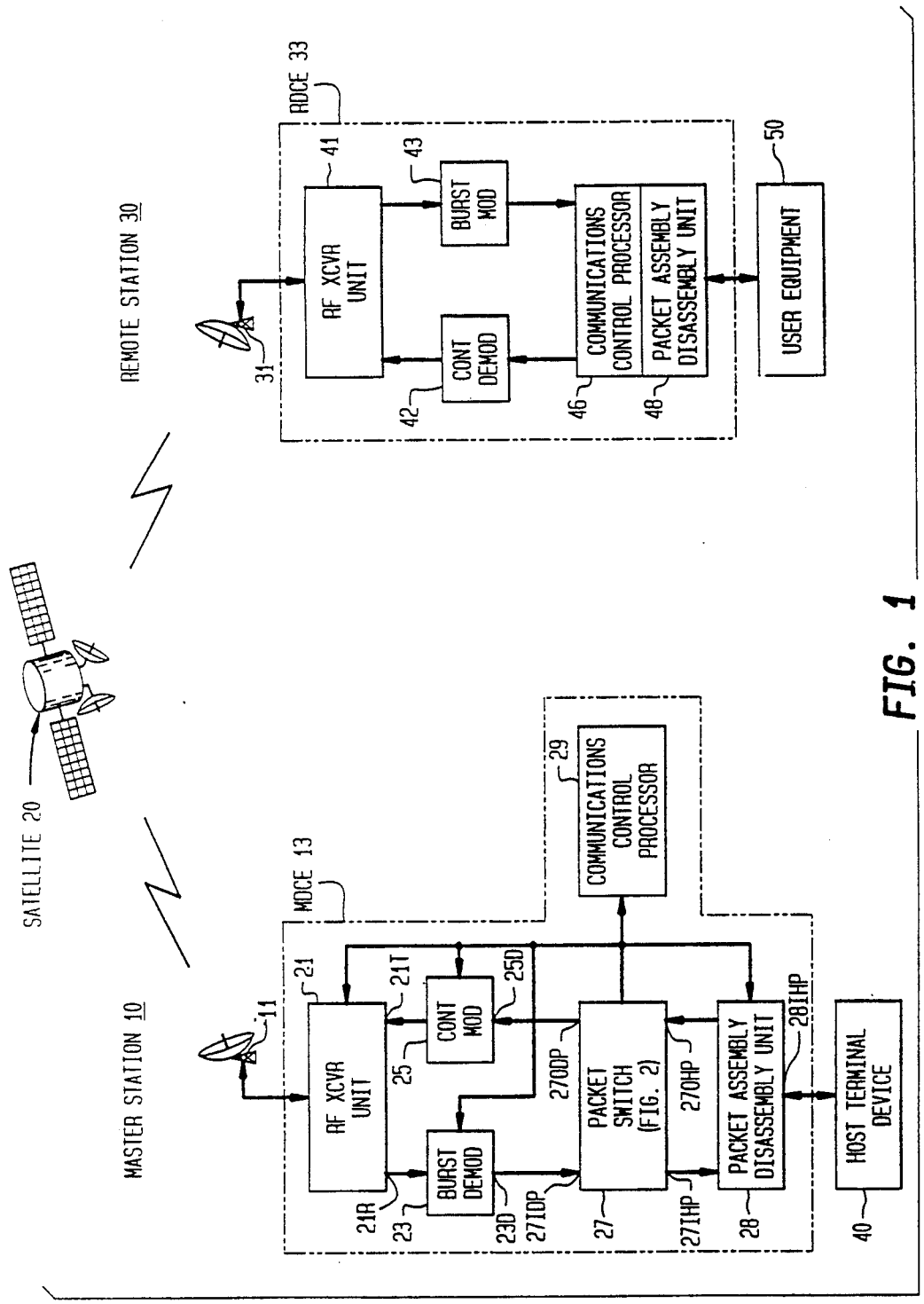
FIG. 1 is a diagrammatic illustration of a satellite communications system employing the improved link utilization control mechanism in accordance with the present invention.

Before describing in detail the particular improved link utilization control mechanism in accordance with the present invention, it should be observed that the present invention resides primarily in a novel structural combination of convention communication and signal processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring now to FIG. 1, a diagrammatic illustration of a satellite communications system employing the improved communication control system in accordance with the present invention is illustrated as comprising a master station 10 which communicates via a satellite 20 with each of a plurality of remote stations 30, so that, in effect, the satellite communications network may be considered as what is normally referred to as a star-configured network, with the hub of the star corresponding to master station 10 and the points of the star corresponding to the remote stations 30. Master station 10 broadcasts messages on a first continuously transmitted (Ku band) outlink carrier through satellite 20 to all of the remote stations 30. Each of remote stations 30 continuously monitors the outlink channel for messages directed to it, as identified by the contents of a remote station address contained within the station-to-station layer of the communication protocol, as will be described below. Each remote station 30 transmits message to master station 10 in a burst-mode format, through satellite 20 over a dedicated remote-to-master (Ku band) return link channel.

The master station 10 itself is shown as comprising a satellite communication antenna 11 for transmitting and receiving Ku band signals via satellite 20 by way of associated master data communications equipment (MDCE) 13. Master data communications equipment 13 includes a RF transceiver unit 21, a received carrier output port 21R of which is coupled to a return link burst demodulator 23 and an outlink continuous modulator input port 21T of which is coupled to a continuous modulator 25. The respective data communication ports 23D and 25D of burst demodulator 23 and continuous modulator 25 are coupled to a packet switch 27, through which transmitted and received messages are interfaced to an associated packet assembly/disassembly device (PAD) 28, for coupling data packets with respect to one or more host terminal devices (such as mainframe computers) 40, serviced by the MDCE 13. Each of the burst continuous demodulator 25, packet switch 27 and PAD 28 are controlled by an attendant master station communications control processor 29.

Each remote station 30 is configured similar to the master station 10, in that it includes a satellite communications antenna (such as a very small aperture terminal (VSAT) antenna dish) 31, coupled with an RF transceiver unit 41 of associated remote data communications equipment (RDCE) 33. Within RDCE 33, the RF transceiver unit 41 is coupled to a continuous carrier demodulator 42 for demodulating incoming messages from master station 10 and an outgoing burst modulator 43 for effecting return link carrier burst communications of messages that originate at the remote station 30 for transmission to master station 10. Each of continuous demodulator 42 and burst modulator 43 is coupled to a communications control unit 45 which includes a communications control processor 46 and a packet assembly/disassembly device (PAD) 48, for coupling data packets with respect to one or more user terminal devices 50, serviced by the MDCE 13. Each of continuous demodulator 42, burst modulator 43 and PAD 48 are controlled by an associated remote station communications control processor 46.

Except for the communication control mechanisms, to be described below with reference to FIGS. 2-6), employed by communications control processor 29 and associated packet switch 27 within the master data communications equipment 13 at master station 10 and that employed by communications control processor 46 at the remote station 30, the configuration and hardware components employed by each of the master station 10 and the remote station 30, described above, are conventional and will not be described in detail here. Rather, the description to follow will address the details of the modifications to the packet switches and the communications protocol, summarized briefly above, through which the link utilization control mechanism of the present invention is implemented.

Before describing the details of the present invention, it is useful to briefly review the operation a star-configured satellite communication network employing continuous mode outlink transmissions from the master station to the remote stations and burst mode return link transmissions from the remote stations to the master station.

At the master station 10, master data communications equipment 13 is ported to one or more host terminal devices 40 that may source or receive digital data communications. When a host device 40 desires to communicate with user equipment 50 that is serviced by a remote station 30, it forwards a data communications request and any attendant data over its local link to a host port 28HP of PAD 28. PAD 28 takes each transmission request, assembles the necessary outlink message packet(s) and then forwards the packet to packet switch 27, wherein the message is temporarily buffered for application to continuous carrier modulator 25 and transmission via RF transceiver unit 21 and antenna 11 over the outlink satellite channel. The formatting, assembly and disassembly of messages is controlled within master data communications equipment 13 by communications control processor 29, which contains the link utilization control mechanism of the present invention to be described in detail below.

In order to provide a synchronization reference for all of the users of the network, master station 10 modulates continuously transmitted outlink carrier with a time slot marker, which is monitored by each remote station to regulate when return link data message time slots and acknowledgement message time slots (which are reserved or preassigned by the master station) occur. As pointed out briefly above, and is will be explained in detail below, return link data message time slots are normally accessed by the remote stations on a contention basis, but may be reserved by the master station in response to request by a remote station that has encountered a transmission congestion condition. Also modulated onto the continuous carrier are packets output from packet switch 27 to continuous modulator 25 for broadcast on the outlink channel in response to requests from host terminal devices 40. Incoming burst-mode return link messages from the remote stations are demodulated by burst demodulator 23 are buffered and disassembled through packet switch 27 and PAD 28 and then output to a destination host terminal device 40.

At each remote station 30, the outlink (master-to-remote) channel is monitored continuously for any message that may be addressed to that particular remote station by the master station 10. Namely, communications control unit 45 continuously monitors the output of continuous demodulator 42 for the presence of messages that contain the address of that remote station. When the remote station sees its own address, it then captures the message and buffers its contents within PAD 46, so that it may be disassembled and output therefrom to user equipment 50 over a local communication link that connects the user equipment to the PAD. Similarly, outgoing messages from user equipment 60 (such as data to be transmitted in response to a file request from a host computer 40 at the master station) are coupled to PAD 46, which the assembles the packet(s) for application to burst modulator 43 and transmission in burst format on the return link channel through the satellite.

As pointed out briefly above, a communication protocol often used for terrestrial packet switching data transmission systems, particularly land-link telephone networks employing terminal-to-terminal and terminal-to-host communications, is X.25 communication protocol, the station-to-station control layer of which contains a transmit/receive channel designation (address) field and implies point-to-point utilization, exclusively. Normally, such a protocol is not usable in a shared channel multi-station satellite communication network, since point-to-point communications require dedicated links between each station.

In a shared link network configuration as shown in FIG. 1, the protocol employed for station-to-station communications is normally designed to operate with a limited number of user interfaces, which inevitably results in a higher subscription cost to the user and often makes access to a satellite communications network prohibitively expensive.

Pursuant to a first aspect of the present invention there is provided a communication interface mechanism that enables messages to be transmitted over the shared satellite communications channel by means of a modified version of the above-referenced X.25 point-to-point communications protocol, which facilitates interfacing of the packet switches of each station of the network with its associated packet assembly/disassembly device and enables the outlink and return link channels to effectively simulate point-to-point communications between the master and remote stations.

For messages transmitted from a remote station 30 to master station 10, the modification of the protocol comprises incorporating into each message an auxiliary identification code (such as an additional (abbreviated) two byte, subaddress field) which identifies the remote station sourcing the message. At the master station 10, packet switch 27 is provided with an auxiliary memory space, containing a plurality of pseudo port entries, into respective ones of which return link messages, coupled via one or more input ports 27IDP from burst demodulator 23, are stored or buffered, and the addresses of which are designated in accordance with the identification codes of the remote stations contained within the received messages. Packet switch 27 outputs each buffered (X.25) point-to-point protocol message, absent its auxiliary identification code, via an output port 270HP to PAD 28, so that the data may be forwarded to a destination host computer 40. Thus, to PAD 28, which interfaces the host terminal device 40 with packet switch 27, communications appear to be effected through dedicated ports of packet switch 27 to a point-to-point link to a remote station 30.

Consistent with the modification of point-to-point protocol for remote-to-master station communications over the contention return link channel, outgoing messages from a host computer 40, and coupled from the master station PAD 28 to an input port 271HP of packet switch 27 for transmission to a remote station, are initially buffered in the pseudo port entry of the auxiliary memory space of the master station's packet switch, whose address corresponds to the identification of the destination remote station and which appears to PAD 28 as a dedicated packet switch output port having a point-to-point communication link to the remote station. In the course of outputting the buffered message via an output data port 270DP for application to continuous modulator 25 and transmission over the outlink channel, packet switch 27 incorporates into that message the auxiliary two byte address (the pseudo port entry where the buffered message is stored) which identifies the destination remote station. The message is then broadcast by the master station over the outlink channel to each of the remote stations.

The communications control unit 45 at each remote station continuously monitors output of continuous demodulator 42 for messages that may be addressed to it, namely for the presence of its own identification code within each message broadcast by master station 10. When a remote station detects its identification code, it captures the message and then outputs it on to its associated packet assembly/disassembly device, absent the station identification code, so that, to that destination terminal device, it appears as though it has received a message from the master station over a dedicated point-to-point link. Thus, to users of the network, it appears that communications are point-to-point, while, in reality, they are carried out over what is effectively a shared multi-drop network.

Figure 2:
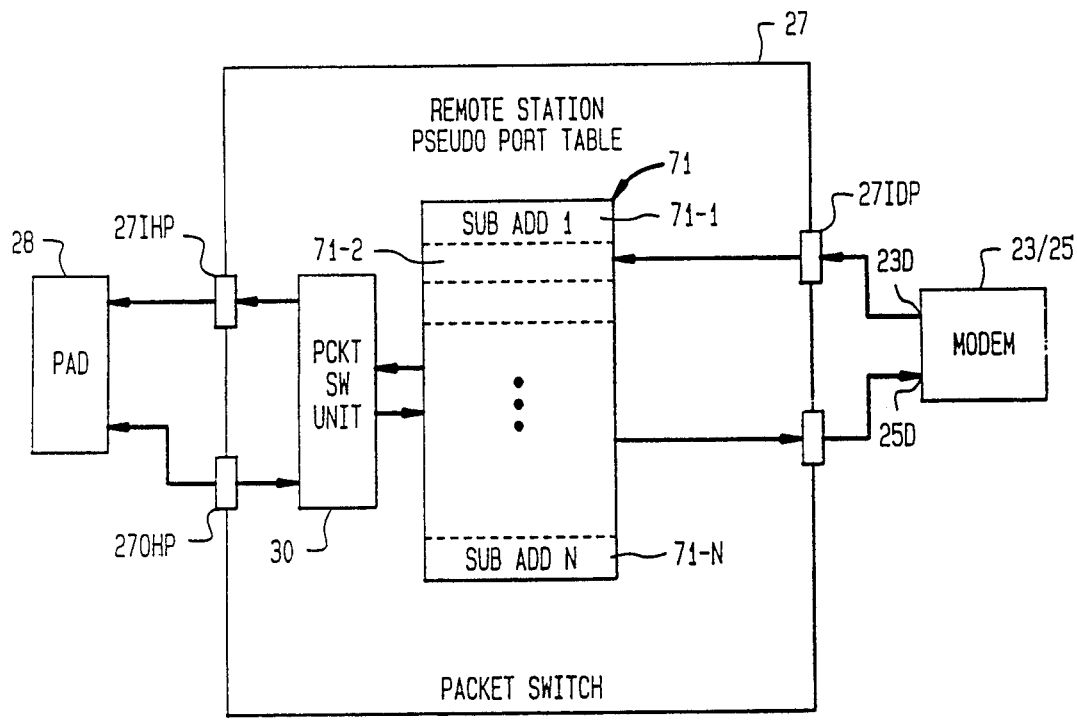
FIG. 2 diagrammatically illustrates a modification of packet switch memory space for providing a plurality of 'pseudo' ports through which point-to-point connections may be simulated.

Referring now to FIG. 2, the above-referenced modification of the packet switch memory space, so as to effectively provide a plurality of 'pseudo' ports through which point-to-point connections may be simulated for the use of X.25 protocol, is diagrammatically illustrated as a table 71 having a plurality of message entries 71-

1....71-N, each of which is a queue that stores messages to be transferred to and from one of ports 271DP and 270DP (to which the master station modem equipment (demodulator 23 and modulator 25) is coupled). The host ports 271HP and 270HP are coupled to the modem ports 271DP and 270DP via the packet switching unit 30. The address of each entry of 'pseudo' port table 71 specifies a 'pseudo' port to which the modem 23/25 is connected, rather than an actual hardware port 271DP/270DP. Each 'pseudo' port address is the address of one of the remote stations 30 with which the master station 10 may communicate.

In conventional point-to-point communications protocol, such as the above-mentioned X.25 protocol, the communications control layer which defines station-to-station transmissions includes an address frame which simply prescribes the outlink and return link channels (reversed for opposite ends of the link). Consequently, whenever a host device 40 serviced by master station 10 desires to communicate with user equipment 50 at a remote station 30, it forwards that message to PAD 28, which assembles a data packet message using X.25 protocol and couples the data packet message to packet switching unit 30 within packet switch 27 to what packet switching unit 30 thinks is a hardware port dedicated to point-to-point communications to the destination remote station. In accordance with the present invention, however, the message, in reality, is directed to that one of the 'pseudo' port entries of table 71 whose address is the identification of the destination remote station. Still, as far as packet switching unit 30 is concerned, the message is being ported to a dedicated communications link, compatible with the X.25 protocol it is using.

Figure 3:
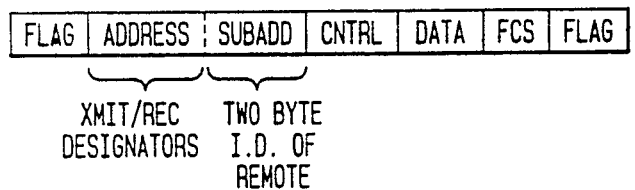
FIG. 3 shows a modification of X.25 protocol in which a subaddress field SUBADDR is appended to the address field.

In accordance with the modified point-to-point protocol control mechanism of the present invention, the address of the accessed entry of table 71 is used to define an additional (two byte) subaddress field (which identifies the remote station for whom the packet is intended), which is inserted into the communication layer through which point-to-point communications using X.25 protocol are normally defined. This modification is illustrated in FIG. 3 which shows a typical X.25 point-to-point message having front end and rear end flag bytes FLG between which address ADD, control CNTRL, data DATA and frame check sequence FCS fields are inserted. Pursuant to the present invention, the additional two-byte subaddress SUBADDR is appended to the address field by the communications control processor 50 as it forwards the contents of a 'pseudo' port table entry 71-i to continuous modulator 25 by way of packet switch output port 270DP.

At the remote station 30, the subaddress field of each message packet transmitted from master station 10 output from continuous demodulator 42 is examined by communications control processor 46 to determine whether its subaddress field SUBADDR identifies that remote station. When the communications control processor 46 determines that the subaddress field identifies that remote station, it causes the incoming message to be coupled to PAD 48, but removes the subaddress from the point-to-point protocol layer that was inserted in accordance with the operation of the 'pseudo' port mechanism at the master station, described above. The message is then output over the local communications network to which the remote station is coupled for transmission to the intended user equipment 50.

Conversely, when a message packet is assembled by PAD 48 for transmission over the return link channel to master station 10, the address of that sourcing remote station is inserted by its communications control processor 46 as the above-mentioned subaddress field in the point-to-point channel definition layer of the X.25 communications protocol. Then, at the master station, when the incoming burst message is coupled from burst demodulator 23 to input port 271DP of packet switch 27, control processor 29 uses the subaddress field to direct the incoming message to its corresponding entry in 'pseudo' port table 71 absent the subaddress field. Packet switching unit 30 then couples the contents of that entry of the 'pseudo' port table 71 to PAD 28 via port 1HP for delivery to the destination host terminal device 40.

To each of the packet switching unit 30 (and, consequently, PAD 28 at master station 10) and PAD 48 at remote station 30, the additional two-byte subaddress is effectively invisible, so that it appears to device that there is a direct point-to-point connection between the remote station and the master station, rather than a shared communication channel therebetween, so that the end user of the network is able to use conventional X.25 protocol, as is, yet have access to a shared communications network.

In a communication network employing a shared communications channel, it is common practice to employ acknowledgement messages to confirm receipt of a data packet. Conventionally, sending an acknowledgement message has involved sending a packet, the information contained within which essentially indicates that the data packet of interest was successfully received, so that the source station need no longer retain or store that data packet for retransmission (as would be necessary, for example, in the case of a collision, the retransmission being governed by a prescribed collision recovery mechanism). A shortcoming in slotted channels in sending acknowledgement packets in data slots is the fact that the acknowledgement message normally requires only a few bytes of information, whereas a data slot is large enough to contain a data packet of up to, usually, 128 to 1,000 bytes, depending on system configuration. In other words, using data slots for overhead (e.g. acknowledgements) constitutes an extremely inefficient utilization of the satellite channel.

In accordance with the present invention, this waste of a precious resource (the shared/contention return link channel) is obviated by subdividing the time slots during which burst mode communications from the remote stations to the master station may take place into interleaved sequences, one of which contains (relatively long duration) data packet time slots and the other of which is comprised of (very short duration) overhead time slots. Because the duration of each acknowledgement (overhead) time slot is only a fraction of the portion of a data packet time slot, that channel occupation efficiency can be effectively enhanced.

Each acknowledgement time slot on the return link channel is reserved or preassigned by the master station when the master station transmits a data packet to a remote station, by including as part of the information in the data packet the identification of a subsequently occurring overhead time slot during which the remote station is to transmit its acknowledgement of receipt of that data packet back to the master station.

Figure 4:
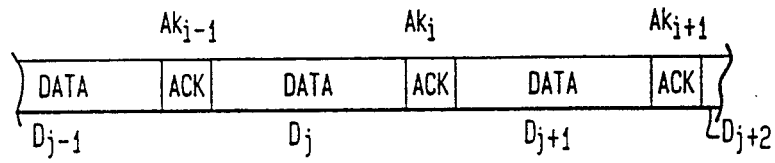
FIG. 4 diagrammatically illustrates the manner in which acknowledgement time slots and data packet time slots are interleaved with one another.
Figure 5:
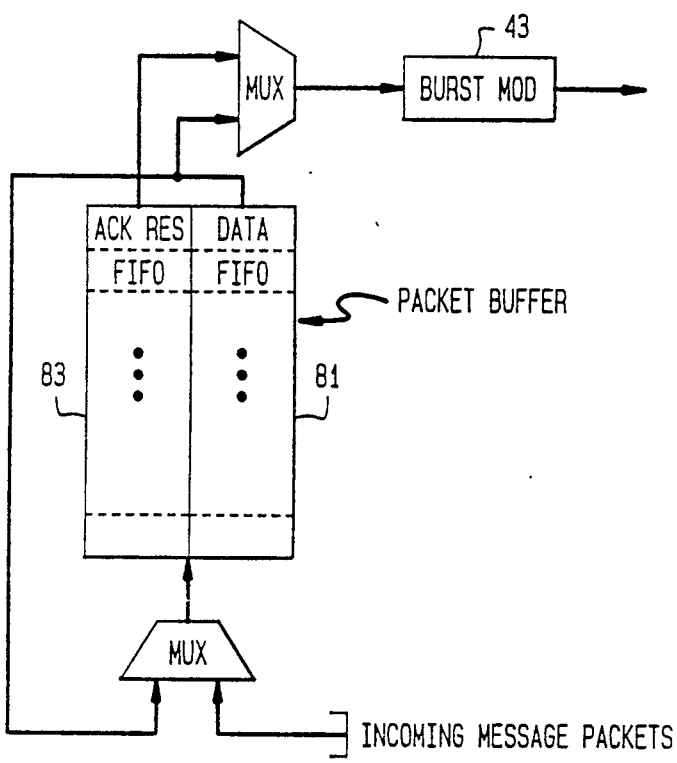
FIG. 5 diagrammatically shows a transmission buffer in which data and acknowledgement packets are queued.
Figure 6:
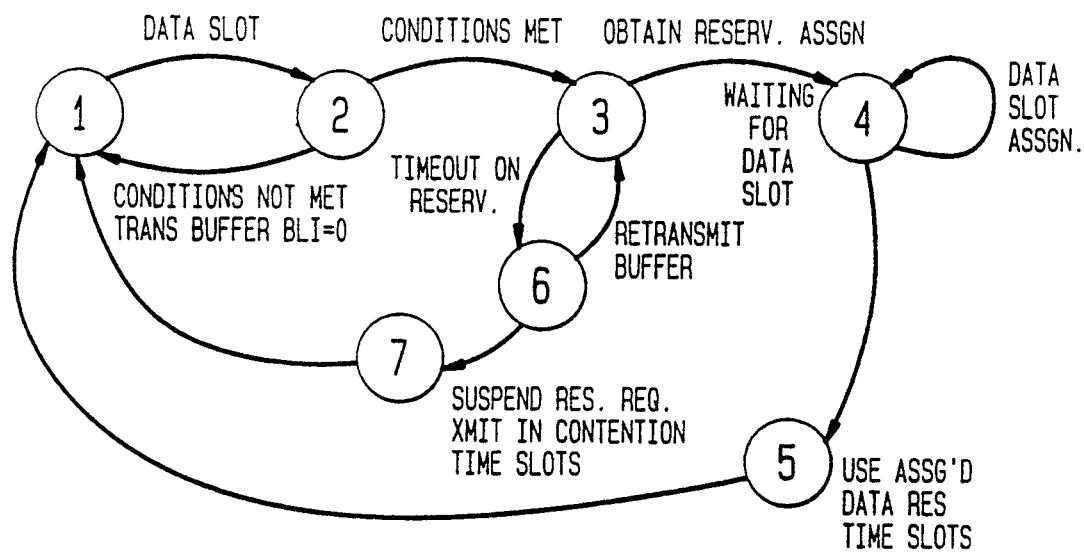
FIG. 6 is a state diagram of a control mechanism employed for requesting reservation of data time slots.

The manner in which the acknowledgement time slots and data packet time slots are interleaved with one another is diagrammatically illustrated in FIG. 4, which shows a sequence of data time slots $D_{j-1}$, $D_j$, $D_{j+1}$, $D_{j+2}$ and interleaved acknowledgements time slot $Ak_{i-1}$, $Ak_i$, $Ak_{i+1}$. As noted previously, on the outlink channel, the master station broadcasts a continuous carrier that is monitored by all of the remote stations of the network. Modulated onto this carrier is a clock signal upon which system timing for all users of the network is based. All time slots, whether they be data time slots or acknowledgement time slots, are referenced to the network clock.

In the course of the control of assembly and transmission of a data packet to a remote station, the communications control processor 29 assigns to the recipient remote station a reserved acknowledgement time slot code by referencing that acknowledgement time slot to the network timing signal that is continuously modulated onto the outlink carrier. The communications control processor 29 within master station 10 also stores the most recent acknowledgement time slot reservation code, in order to assure uncontended use of the acknowledgement time slots. Then, as acknowledgements are returned from the remote stations, the master station controller knows that it does not have to retransmit the original packet. The underlying data communication protocol (X.25 in the presently described embodiment) includes a timer, so that in the event that the acknowledgement is not returned within a prescribed period of time, the packet will be transmitted and a new acknowledgement slot assigned, thereby permitting the master station communications controller to keep track of whether transmitted data packets have been received and which packets have not been received and need to be retransmitted.

More particularly, in the course of handling input messages from user equipment 50 for transmission over the return link channel, the message buffer within communications control unit 45 of the remote station 30 buffers or queues data packets supplied by the packet assembly/disassembly unit 48. Similarly, whenever PAD 48 has successfully received a data packet from the master station, communications processor 46 extracts the included acknowledgement slot reservation and stores the reservation in a list in internal memory. The data packet is then passed to PAD 48.

Subsequently, PAD 48 may generate one or more acknowledgements (or negative responses). Pursuant to a redundancy elimination mechanism in accordance with the present invention, as acknowledgements arrive at communications processor 46, they are placed in a first-in/first-out (FIFO) acknowledgement reservation buffer 83, shown in FIG. 5, if there is an upcoming acknowledgement reservation in the above-mentioned list. If, for some reason, there are no upcoming acknowledgement reservations in the list, the acknowledgement packets are placed in a separate data FIFO buffer 81 and treated as data packets for the purpose of transmission. As an acknowledgement packet is about to be placed in either the data FIFO buffer 81 or the acknowledgement FIFO 83, its contents are examined to determine if the new acknowledgement contains more current acknowledgement information than those currently buffered and awaiting transmission. (It should be noted that an acknowledgement of a packet 'p' implicitly acknowledges any previous packets 'p-1', 'p-2', 'p-3', etc.) If so, the acknowledgment contents are replaced with the new information. Thus, acknowledgement traffic is kept to a minimum by eliminating redundant packets.

As each acknowledgement or data slot occurs, communications processor 46 decides whether or not to transmit into the slot. If both the aforementioned acknowledgement reservation list and acknowledgement FIFO are not empty, the communications processor withholds all transmissions until the acknowledgement slot occurs. At that time, the acknowledgement packet is transmitted into the reserved acknowledgement slot and normal processing resumes. This procedure insures proper sequencing of data and acknowledgement packets.

It should be noted that PAD 48, upon transmitting a data packet to the master station, typically will repetitively generate a poll packet for some period of time until it receives an acknowledgement packet from the master station. These repeated poll packets (acknowledgement packets with a 'poll' bit set) are a potential source of message traffic congestion, but are still treated as normal message packets by the communications control unit 45. Consequently, the use of the acknowledgement redundancy feature serves to eliminate superfluous transmissions over the return link channel.

As pointed out previously, in addition to the master station preassigning or reserving acknowledgement time slots on the return link channel for the transmission of acknowledgement messages from remote stations to the master station between data packet time slots, that are normally accessed on a contention basis, provision is made for a remote station to request preassignment or reservation of data packet time slots by the master station, so that the requesting remote station will not have to contend with other remote stations for the use of the remote-to-master channel to transmit its data, but, in a manner similar to the reservation of acknowledgement time slots, will have preassigned to it specific data packet time slots within which to transmit data packets that are resident in its message queue 81.

More specifically, as pointed out briefly above, as message packets (data or acknowledgement) are supplied by terminal equipment serviced by the remote station data communications equipment 33, the messages are queued up in a FIFO 81. As the packets cycle through the FIFO and exit the output buffer register, they are examined for communication control indicators (tags) that may determine what type of communication control action will be taken.

If the volume of message traffic at a remote station builds up to a prescribed threshold level, which can be expected to cause the need for retransmission, resulting from the probable occurrence of collisions with other contention slot access transmissions by other remote stations, then there is an increased likelihood that if the system continues to operate in its normal contention data time slot mode, more and more data packets will require transmission, so that eventually throughput from the remote station to the master station becomes effectively nil.

To handle this overload condition, the present invention provides a mechanism through which what are normally contention time slots for data transmission are reserved or assigned for use by a remote station, so that it is effectively guaranteed that a data packet currently buffered at the remote station for transmission to the master station will have access to an available time slot. For this purpose, communications control processor 46 employs a mechanism, to be described below, which monitors the contents of the outgoing message buffer 81 to determine whether a number of saturation onset conditions have been satisfied that mandate a request for the preassignment or reservation of data packet time slots by the master station for use by the remote station. If the number of entries within buffer 81 reaches a prescribed threshold (set in accordance with a preselected saturation/traffic density criteria) the data packets of the buffer are examined to determine whether any data packet contains a retransmission flag that was set in the event of a previously attempted transmission and reentry of the packet into the first or input stage of FIFO 81. If both the threshold and retransmission flag criteria have been satisfied, then the normal contention mode of return link access by that remote station is interrupted and a prescribed data time slot reservation request message is transmitted to the master station. The control mechanism employed for requesting reservation of data time slots may be best understood by referring to the state diagram shown in FIG. 6.

Initially, during STATE 1, the contents of the outgoing message buffer 81 are monitored to determine whether the number of entries in the buffer (buffer level indicator BLI) exceeds a given threshold ($BLI_{MAX}$) and whether there is any data packet entry within the FIFO 81 that has been tagged as a retransmission entry (namely, a data packet that has been previously transmitted without the return of an acknowledgement from the master station, as indicated by a break in the PAD 48-supplied data packet sequence number). As long as the number of entries or buffer level indicator BLI within the queue 81 is less than the threshold $BLI_{MAX}$ and there are no pending retransmission data packet requests, then the data packet contents of the output stage of the message buffer are transmitted in a normal contention mode and control processor 46 forwards the data packets on to the burst modulator 43 for transmission during the next data packet time slot.

If, however, both of the above conditions has been fulfilled (STATE 2), namely the size of the queue exceeds the threshold i.e. $BLI > BLI_{MAX}$ and buffer 81 contains a data packet that has been tagged as a retransmission packet, the control mechanism proceeds to STATE 3 in which a prescribed reservation request is "attached" as part of the overhead of the next data packet to be transmitted. Included as part of the information contained in the reservation request is the depth of buffer 81, namely BLI, in order to that the number of data time slots reserved by the master station will be sufficient to empty out buffer 81 and clear up the congestion problem.

When the data packet with the reservation request is transmitted in the next contention time slot over the return link channel, a transmission request soft-counter is incremented to indicate that a first request for a reservation assignment to the master station has been made. As long as the contents of the counter is less than a prescribed value, and until the reservation request has been granted, the remote station will continue to retransmit its request for a reservation. If the request is immediately granted and the remote station receives data time slot assignment message from the master station, it proceeds to STATE 4 and waits for the reserved slots to occur. It then places the data packets awaiting service in the assigned time slots, transmits the data to the master station (STATE 5) and then returns to STATE 1. It should be noted that every message transmitted over the outlink channel is received by all remote stations, although in normal circumstances only one (individually addressed) remote station will capture the packet. The contents of reservation assignment message, however, having had a global address, will be read by all stations, so that their control processors will comply with the reservation assignment and only that remote station for whom a reservation assignment has been awarded will us the assigned data time slots. If the request is not immediately granted, then, after a prescribed period of time, the remote station will proceed to increment its reservation soft-counter (STATE 6) and retransmit the reservation request message (return to STATE 3). This procedure is repeated for a specified number of retransmission intervals until a reservation message is received or until the increment counter times out. In the latter situation, the data slot reservation control mechanism proceeds from STATE 6 to STATE 7, in which communication control unit 45 interrupts or suspends the forwarding of the reservation request message stored in buffer 82 to the burst modulator 43 and, instead, reverts to the normal contention mode, continuing to use the next data message time slot that becomes available, until the current contents of the message queue have been serviced.

The effect of the data time slot reservation mechanism is to give remote stations having long or backed-up message queues the ability to temporarily empty their message buffers in a time slot-efficient manner (at the expense of delay). Namely, the queued messages are transmitted without contention, thus removing some of the load from the network. As a consequence, the heavier the load on the network, the more the operation tends to look like a time division multiplied access (TDMA) communication scheme rather than a slotted, demand assignment system. It should be recalled, however, that, although a TDMA scheme allows a higher percentage of time slots to be used (there are no collisions), under normal circumstances it suffers a longer delay since, in effect, a TDMA system operates essentially as a polling mechanism.

As will be appreciated from the foregoing description, the improved link utilization control mechanism according to the present invention provides a number of enhancements to demand assignment satellite communication networks that facilitate access by and throughput between users of the network. By means of minor modification to a point-to-point communications protocol (X.25), it is possible to simulate point-to-point communication ports and thereby readily interface what is effectively a multidrop network with point-to-point landlink communication resources.

In addition, the acknowledgement reservation mechanism substantially obviates the overhead and throughput penalties encountered in the use of data packets to transmit reduced size acknowledgement messages. Since the length of an acknowledgement message is considerably shorter than the length of a data packet, the dedication and reserving of such acknowledgement time slots does not detrimentally impact channel utilization. Also, preassigning or reserving these reduced capacity slots for return-to-master acknowledgements serves to minimize collisions and thereby improve overall network performance.

Finally, by augmenting the normal contention mode of operation with a data time slot reservation mechanism during periods of increased message input density at a remote station, transmission throughput is facilitated so that congestion at the station is reduced.

While we have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a communications system having a master station and a plurality of remote stations which communicate with one another over a communications channel, each of said remote stations having the capability of transmitting messages over said communications channel to said master station during time slots that are normally accessible by the remote stations on a contention basis, a method of controlling the transmission of message, awaiting service in a message storage facility at a remote station, over said communication channel to said master station comprising the steps of:
   (a) in response to the occurrence of a prescribed condition of the contents of said message storage facility in which messages awaiting transmission over said communication channel to said master station are stored, transmitting a request to said master station for the reservation of contention time slots to be used by said remote station for the transmission of messages awaiting service in its message storage facility;
   (b) in response to receiving a message from said master station that contains the identification of contention time slots that are to be reserved for use by said remote station, proceeding to transmit messages stored in said message storage facility over said communications channel to said master station during said reserved time slots; and
   (c) in response to the lack of receipt of a message from said master station that contains the identification of contention time slots that are to be reserved for use by said remote station, within a prescribed period of time after transmitting said reservation request, proceeding to transmit messages stored in said message storage facility over said communications channel to said master station during non-reserved contention time slots.

2. A method according to claim 1, wherein step (a) includes the step of, in the absence of the occurrence of said prescribed condition, transmitting messages, awaiting service in said message storage facility in contention time slots, over said communications channel to said master station, on a contention basis.

3. A method according to claim 2, wherein said prescribed condition includes the condition in which the number of messages awaiting has reached a preselected number and the condition in which said message storage facility contains a message that has been previously transmitted and is awaiting retransmission by said remote station to said master station.

4. For use with a communications system having a master station and a plurality of remote stations which communicate with one another over a communications channel, each of said remote stations having the capability of transmitting messages over said communications channel to said master station during time slots that are normally accessible by the remote stations on a contention basis, and arrangement for controlling the transmission of messages, awaiting service in a message storage facility at a remote station, over said communication channel to said master station comprising:
   first means, responsive to the occurrence of a prescribed condition of the contents of said message storage facility in which messages awaiting transmission over said communication channel to said master station are stored, for causing a request message to be transmitted to said master station for the reservation of contention time slots to be used by said remote station for the transmission of messages awaiting service in its message storage facility; and
   second means, responsible to receipt of a message from said master station that contains the identification of contention time slots that are to be reserved for use by said remote station, for causing messages stored in said message storage facility to be transmitted over said communications channel to said master station during said reserved time slots, wherein said second means includes means, responsive to the lack of receipt of a message from said master station that contains the identification of contention time slots that are to be reserved for use by said remote station, within a prescribed period of time after transmitting said reservation request, for causing messages stored in said message storage facility to be transmitted over said communications channel to said master station during non-reserved contention time slots.

5. A method of controlling the transmission of messages, awaiting service in a message storage facility at a remote station, over a communication channel to a master station in a communications system having a master station and a plurality of remote stations, during time slots that are normally accessible by the remote stations on a contention basis, the method comprising the steps of:
   (a) transmitting a reservation request signal from a remote station to said master station for the reservation of contention time slots to be used by said remote station for the transmission of messages awaiting service in its message storage facility as a function of saturation/traffic density;
   (b) in response to receiving a reservation acknowledgement signal from said master station, proceeding to transmit messages stored in said message storage facility over said communications channel to said master station during reserved time slots; and
   (c) in response to the lack of receipt of a reservation acknowledgement signal from said master station within a prescribed period of time after transmitting said reservation request, proceeding to transmit messages stored in said message storage facility over said communications channel to said master station during non-reserved contention time slots.

6. A method according to claim 5, wherein step (a) includes the step of, in the absence of the occurrence of a prescribed condition that is set in accordance with said saturation/traffic density, transmitting messages awaiting service in said message storage facility over said communications channel to said master station in contention time slots on a contention basis.

7. A method according to claim 6, wherein said prescribed condition includes the condition in which the number of messages awaiting has reached a preselected number and the condition in which said message storage facility contains a message that has been previously transmitted and is awaiting retransmission by said remote station to said master station.

8. A device for controlling the transmission of messages, awaiting service in a message storage facility at a remote station, over a communication channel to a master station in a communications system having a master station and a plurality of remote stations, during time slots that are normally accessible by the remote stations on a contention basis, comprising:
- means for transmitting a reservation request signal from a remote station to said master station for the reservation of contention time slots to be used by said remote station for the transmission of messages awaiting service in its message storage facility as a function of saturation/traffic density;
- means for responding to the receipt of a reservation acknowledgement signal from said master station, and transmitting messages stored in said message storage facility over said communications channel to said master station during reserved time slots; and
- means, responsive to the lack of receipt of a reservation acknowledgement signal from said master station within a prescribed period of time after transmitting said reservation request, for transmitting messages stored in said message storage facility over said communications channel to said master station during non-reserved contention time slots.

9. A device for controlling the transmission of messages, awaiting service in remote station, over a communication channel to a master station in a communications system having a master station and a plurality of remote stations, during time slots that are normally accessible by the remote stations on a contention basis, comprising:
- a storage unit for storing messages awaiting service;
- means for attaching a retransmission flag to a message that indicates an unsuccessful transmission attempt of said message has previously been made;
- means for comparing the number of messages stored in said storage unit against a prescribed threshold;
- means for determining whether any message stored in said storage unit has an attached retransmission flag; and
- means for retransmitting a reservation request signal from a remote station to said master station for the reservation of contention time slots to be used by said remote station for the transmission of messages awaiting service in its storage unit when the number of messages stored in said buffer reach the prescribed threshold and at least one of the messages stoed in said storage unit has an attached retransmission flag.

10. The device of claim 9, further comprising a counter which is controllably incremented after the reservation request signal has been first transmitted.

11. The device of claim 10, further comprising means for receiving a reservation acknowledgement signal from the master station indicating contention time slots are reserved for the transmission of messages stored in said storage unit of said remote station transmitting the reservation request signal.

12. The device of claim 11, further comprising means for re-transmitting the reservation request signal until said means for receiving receives a reservation acknowledgement signal or until said counter times out, and means for reverting, in response to a time out by said counter to a normal contention mode in which said messages are sent to said master station during time slots accessible to said remote stations on a contention basis.

13. The device of claim 12, wherein said storage unit comprises a first in, first out (FIFO) buffer.

14. A method of controlling the transmission of messages, awaiting service in a remote station, over a communication channel to a master station in a communications system having a master station and a plurality of remote stations, during time slots that are normally accessible by the remote stations on a contention basis, comprising the steps of:
- (a) storing messages awaiting service;
- (b) attaching a retransmission flag to a message that indicates that an unsuccessful transmission attempt of said message has previously been made;
- (c) comparing the number of messages stored in step (a) against a prescribed threshold;
- (d) determining whether any message stored in step (a) has an attached retransmission flag; and
- (e) transmitting a reservation request signal from a remote station to said master station for the reservation of contention time slots to be used by said remote station for the transmission of stored messages awaiting service when the number of stored messages reach the prescribed threshold and at least one of the stored messages has an attached retransmission flag.

15. The method of claim 14, further comprising the step of (f) incrementing a counter after the reservation request signal has been first transmitted.

16. The method of claim 15, further comprising the step of (g) receiving a reservation acknowledgement signal from the master station indicating contention time slots are reserved for the transmission of stored by messages, said remote station transmitting the reservation request signal.

17. The method of claim 16, further comprising the step of (h) re-transmitting the reservation request signal until a reservation acknowledgement signal is received by the remote station transmitting said reservation request signal or until the counter incremented in step (f) times out, and reverting in response to a time out of said counter, to a normal contention mode in which said messages are sent to said master station during time slots accessible to said remote stations on a contention basis.

18. The method of claim 17, wherein step (a) comprises storing messages in a first in, first out (FIFO) buffer.

* * * * *